United States Patent
Lim et al.

(10) Patent No.: US 12,263,719 B2
(45) Date of Patent: *Apr. 1, 2025

(54) CONTROL SYSTEM AND CONTROL METHOD FOR VEHICLE

(71) Applicants: HYUNDAI MOTOR COMPANY, Seoul (KR); KIA CORPORATION, Seoul (KR)

(72) Inventors: Tae Woong Lim, Hwaseong-si (KR); Hyun Kyun Jung, Seoul (KR); Ji Wan Son, Yongin-si (KR); Han Sol Mun, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,627

(22) Filed: May 15, 2024

(65) Prior Publication Data
US 2024/0294052 A1 Sep. 5, 2024

Related U.S. Application Data

(63) Continuation of application No. 17/897,422, filed on Aug. 29, 2022, now Pat. No. 12,011,973.

(30) Foreign Application Priority Data

Dec. 14, 2021 (KR) .................. 10-2021-0178960

(51) Int. Cl.
*B60H 1/00* (2006.01)
*F01P 3/20* (2006.01)

(52) U.S. Cl.
CPC ............ *B60H 1/00835* (2013.01); *F01P 3/20* (2013.01)

(58) Field of Classification Search
CPC .. B60H 1/00835; B60H 1/00849; B60H 1/04; B60H 2001/3273; B60H 1/3208;
(Continued)

(56) References Cited

U.S. PATENT DOCUMENTS 6,672,085 B1 * 1/2004 Sangwan ............... B60H 1/008
62/133
6,807,470 B2 10/2004 Hara
(Continued)

FOREIGN PATENT DOCUMENTS

JP 2009-274694 11/2009
JP 2009274694 A * 11/2009
(Continued)

OTHER PUBLICATIONS

Machine Translation of JP2009274694A PDF File Name: "JP2009274694A_Machine_Translation.pdf".*

*Primary Examiner* — Grant Moubry
*Assistant Examiner* — Ruben Picon-Feliciano
(74) *Attorney, Agent, or Firm* — MCDONNELL BOEHNEN HULBERT & BERGHOFF LLP

(57) ABSTRACT

A control method for a vehicle includes determining whether an internal combustion engine is overheated based on driving information of the vehicle and cooling information of a passenger compartment while the vehicle is driving and an HVAC system is operating in a cooling mode, and controlling an alternator or an actuator of a switching door to reduce a cooling capacity provided by the HVAC system when it is determined that the internal combustion engine is overheated.

7 Claims, 3 Drawing Sheets

(58) Field of Classification Search
CPC .. B60H 1/00; B60H 1/00764; B60H 1/00807; F01P 3/20; F01P 11/16; F01P 2025/32; F01P 2060/08; B60R 16/0307; B60Y 2304/05
See application file for complete search history.

(56) References Cited

U.S. PATENT DOCUMENTS

| | | |
|---|---|---|
| 8,948,964 B2 | 2/2015 | Pan |
| 9,175,631 B2 | 11/2015 | Pan |
| 10,415,863 B2 | 9/2019 | Kim et al. |
| 12,011,973 B2 * | 6/2024 | Lim .................. B60H 1/00849 |
| 2013/0131919 A1 * | 5/2013 | Pan ...................... B60H 1/3208 |
| | | 701/36 |
| 2017/0284719 A1 | 10/2017 | Kim et al. |

FOREIGN PATENT DOCUMENTS

| | | |
|---|---|---|
| KR | 2019980039869 U | 9/1998 |
| KR | 10-0866910 B1 | 11/2008 |
| KR | 2009-0105668 A | 10/2009 |
| KR | 10-1600885 B1 | 3/2016 |
| KR | 2017-0112398 A | 10/2017 |

* cited by examiner

CONTROL SYSTEM AND CONTROL METHOD FOR VEHICLE

CROSS REFERENCE TO RELATED APPLICATIONS

The present application is a Continuation of U.S. patent application Ser. No. 17/897,422, filed Aug. 29, 2022, which claims the benefit of priority to Korean Patent Application No. 10-2021-0178960, filed on Dec. 14, 2021. The entire disclosure contents of these applications are herewith incorporated by reference into the present application.

TECHNICAL FIELD

The present disclosure relates to a control system and a control method for a vehicle, and more particularly, to a control system and a control method for a vehicle that can improve the cooling of an engine coolant and the cooling of a passenger compartment by reducing a cooling capacity of a heating, ventilation, and air conditioning (HVAC) system when an engine is overheated.

BACKGROUND

An internal combustion engine of a vehicle may undergo an increase in temperature due to heat generated when operating. When the temperature of the internal combustion engine rises above a proper temperature, the internal combustion engine may be damaged or explode, and accordingly the internal combustion engine needs to be properly cooled by an engine coolant. The engine coolant may circulate through a water jacket provided in the internal combustion engine. The engine coolant may be heated by the internal combustion engine, and the heated engine coolant may be directed into the water jacket of the internal combustion engine after being cooled by a radiator.

As the internal combustion engine excessively operates and overheating thereof occurs, durability life of the internal combustion engine may be reduced and the power output of the vehicle may be lowered. In particular, when the internal combustion engine is overheated, a compressor of a heating, ventilation, and air conditioning (HVAC) system may be stopped to cool the engine coolant below a predetermined temperature. When the engine coolant is cooled below the predetermined temperature, the compressor may be operated again. That is, when the internal combustion engine is overheated, the compressor of the HVAC system may be repeatedly turned on/off, and accordingly durability of the internal combustion engine and the compressor may be reduced. In particular, when the internal combustion engine is overheated, the compressor of the HVAC system may be temporarily stopped, and accordingly the cooling of a passenger compartment may be stopped, resulting in a reduction in passenger comfort.

To solve this problem, there is provided a method for appropriately lowering the temperature of the engine coolant, without stopping the compressor of the HVAC system, by reducing an operation rate of the compressor according to the temperature of the engine coolant when the internal combustion engine is overheated. An external variable displacement compressor includes an external control valve, which is an electronic control valve, and as a duty cycle of the external control valve is adjusted, an operation rate of the external variable displacement compressor may be adjusted. In order to adjust the operation rate of the compressor according to the temperature of the engine coolant, the external variable displacement compressor is essentially required. That is, a fixed displacement compressor or an internal variable displacement compressor cannot control its operation rate, so the external variable displacement compressor is essentially required to lower the operation rate of the compressor when the internal combustion engine is overheated.

However, the external variable displacement compressor is more expensive than the fixed displacement compressor or the internal variable displacement compressor, which may increase the manufacturing cost of the vehicle. In addition, only lowering the operation rate of the external variable displacement compressor may not be enough to achieve satisfactory cooling of the passenger compartment by the cooling operation of the HVAC system.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a control system and a control method for a vehicle that can improve the cooling of an engine coolant and the cooling of a passenger compartment by reducing a cooling capacity of a heating, ventilation, and air conditioning (HVAC) system when an engine is overheated.

According to an aspect of the present disclosure, a control method for a vehicle may include determining whether an internal combustion engine is overheated based on driving information of the vehicle and cooling information of a passenger compartment while the vehicle is driving and an HVAC system is operating in a cooling mode, and controlling an alternator or an actuator of a switching door to reduce a cooling capacity provided by the HVAC system when it is determined that the internal combustion engine is overheated.

The alternator may be controlled so that power output from the alternator may be lower than maximum output power of the alternator.

The actuator of the switching door may be controlled so that an indoor air fraction may increase as a temperature of an engine coolant increases.

The control method may further include determining whether an accumulated cooling capacity provided by the HVAC system exceeds a reference accumulated cooling capacity after the cooling capacity is reduced.

The control method may further include determining a lower limit temperature of an evaporator of the HVAC system according to a temperature of an engine coolant when the accumulated cooling capacity exceeds the reference accumulated cooling capacity, and repeatedly turning a clutch of a compressor of the HVAC system on/off by comparing a temperature of the evaporator and the lower limit temperature of the evaporator.

The clutch may be turned off when the temperature of the evaporator is lower than the lower limit temperature of the evaporator, the clutch may be turned on when the temperature of the evaporator is higher than a restart temperature, and the restart temperature may be the sum of the lower limit temperature of the evaporator and a restart hysteresis temperature.

According to another aspect of the present disclosure, a control system for a vehicle may include: a processor controlling an engine cooling system and an HVAC system, a determination module determining whether a reduction in cooling capacity is required; and a control module controlling a clutch of a compressor of the HVAC system, an actuator of a switching door of the HVAC system, and an alternator through the determination module.

The determination module may include an engine overheating determination module determining whether an internal combustion engine is overheated, and a cooling determination module determining whether a cooling condition of a passenger compartment meets a reference cooling condition.

The engine overheating determination module may determine whether the internal combustion engine is overheated based on driving information of the vehicle.

The cooling determination module may determine whether the cooling condition of the passenger compartment meets the reference cooling condition based on cooling information of the passenger compartment.

The cooling determination module may determine whether an accumulated cooling capacity provided by the HVAC system meets a reference accumulated cooling capacity.

The control module may include a clutch control module controlling the clutch of the compressor connected to the HVAC system, a switching door control module controlling the actuator of the switching door adjusting an indoor air fraction, and an alternator control module controlling the alternator.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
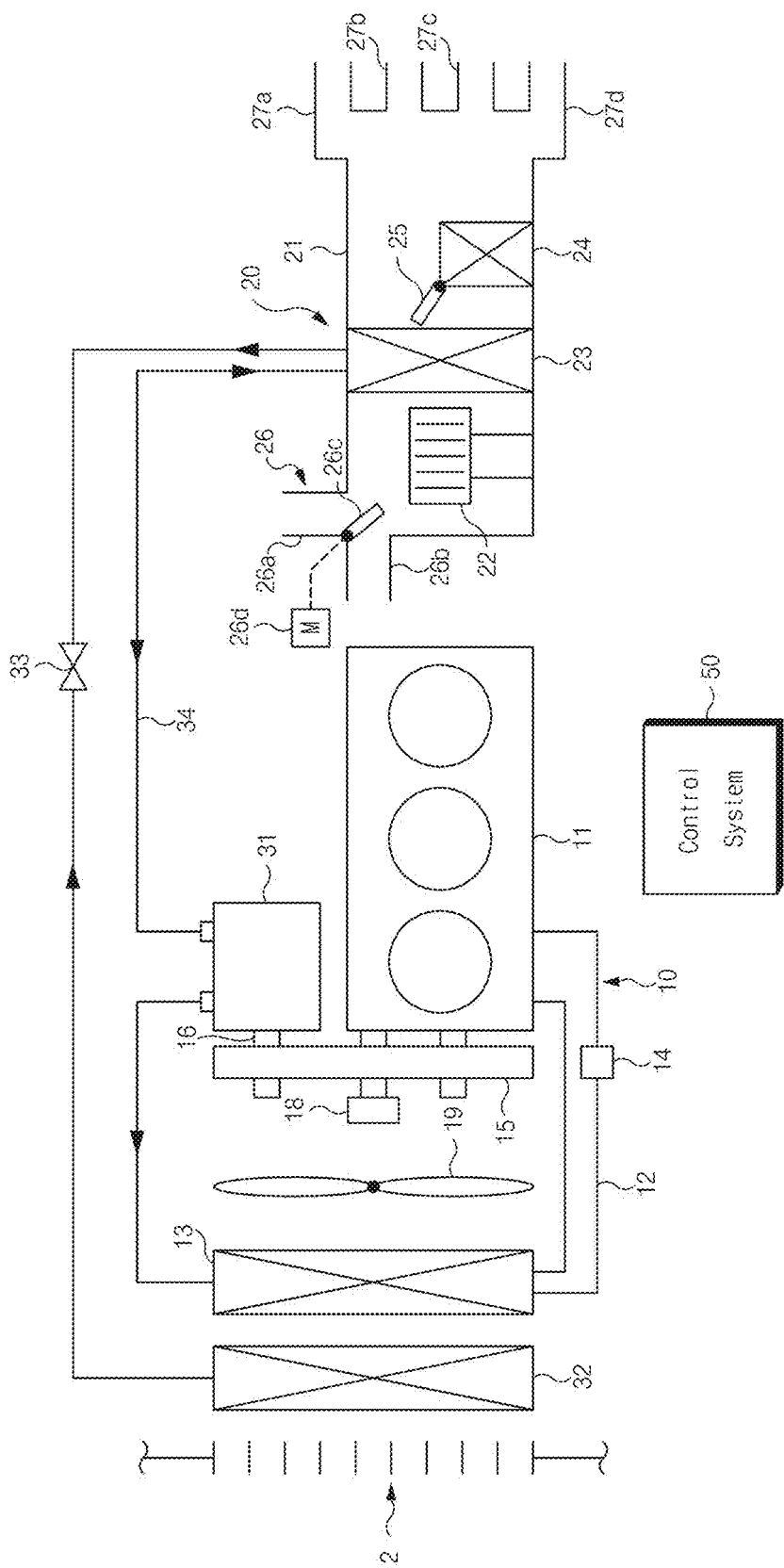
FIG. 1 illustrates a heating, ventilation, and air conditioning (HVAC) system, an engine cooling system, and a control system for controlling the HVAC system and the engine cooling system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates an engine cooling system 10, a heating, ventilation, and air conditioning (HVAC) system 20, and a control system 50 controlling the engine cooling system 10 and the HVAC system 20.

The engine cooling system 10 may include a coolant loop 12 fluidly connected to a water jacket of an internal combustion engine 11, and the coolant loop 12 may be fluidly connected to a radiator 13 and a pump 14. A coolant may circulate through the coolant loop 12 by the pump 14. As the coolant passes through the water jacket of the internal combustion engine 11, the coolant may be heated, and the internal combustion engine 11 may be cooled. The heated coolant may be cooled by the radiator 13.

The HVAC system 20 may include an HVAC casing 21, and an air blower 22, an evaporator 23, a heater core 24, and an air mixing door 25 may be received in the HVAC casing 21. The air blower 22, the evaporator 23, the air mixing door 25, and the heater core 24 may be sequentially arranged within the HVAC casing 21 in an air flow direction from upstream to downstream.

The HVAC casing 21 may include an inlet duct 26 allowing the inflow of indoor air and/or outdoor air, and a plurality of outlet ducts 27a, 27b, 27c, and 27d communicating with the passenger compartment. In addition, the inlet duct 26 may have an indoor air passage 26a guiding the indoor air flow, an outdoor air passage 26b guiding the outdoor air flow, and a switching door 26c disposed between the indoor air passage 26a and the outdoor air passage 26b. The indoor air passage 26a may communicate with the interior of the passenger compartment, and the outdoor air passage 26b may communicate with the outside of the passenger compartment or the outside of the vehicle. The switching door 26c may be operated by an actuator 26d. The switching door 26c may adjust the airflow between the indoor air passage 26a and the outdoor air passage 26b. The switching door 26c may move between an indoor-air circulation position, an outdoor-air intake position, and an intermediate opening position.

When the switching door 26c is in the indoor-air circulation position, the switching door 26c may block the outdoor air from flowing through the outdoor air passage 26b, but may only allow the indoor air to flow through the indoor air passage 26a. When the switching door 26c is in the outdoor-air intake position, the switching door 26c may block the indoor air from flowing through the indoor air passage 26a, but may only allow the outdoor air to flow through the outdoor air passage 26b. When the switching door 26c is in the intermediate opening position, the switching door 26c may allow the indoor air to flow through the indoor air passage 26a and allow the outdoor air to flow through the outdoor air passage 26b.

An indoor air fraction may be determined according to the positions of the switching door 26c, and the indoor air fraction may be a ratio of an indoor-air intake flow rate and a total supply air flow rate. In particular, the indoor air fraction may be defined as a percentage of the indoor air being drawn into the passenger compartment. When the switching door 26c is in the indoor-air circulation position, the opening degree of the indoor air passage 26a may be 100%, and the opening degree of the outdoor air passage 26b may be 0%, and thus the indoor air fraction may be 100%. When the switching door 26c is in the outdoor-air intake position, the opening degree of the outdoor air passage 26b may be 100%, and the opening degree of the indoor air passage 26a may be 0%, and thus the indoor air fraction may be 0%. When the switching door 26c is in the intermediate opening position, the indoor air fraction may be equal to or be proportional to the opening degree of the indoor air passage 26a. As the position of the switching door 26c is adjusted in a state in which the switching door 26c is in the intermediate opening position, the opening degree of the indoor air passage 26a may exceed 0% and be less than 100%.

The air blower 22 may be located on the upstream side of the HVAC casing 21. In particular, the air blower 22 may be adjacent to the inlet duct 26 of the HVAC casing 21.

The evaporator 23 may be configured to cool the air drawn by the air blower 22. According to an exemplary embodiment, a refrigerant loop 34 may be fluidly connected to the evaporator 23, a compressor 31, a condenser 32, and an expansion valve 33 to form a refrigeration cycle, and the evaporator 23 may be configured to cool the air using a refrigerant circulated by the operation of the refrigeration cycle.

The compressor 31 may be operatively connected to the internal combustion engine 11 through an accessory drive belt 15. Power of the internal combustion engine 11 may be transmitted to the compressor 31 through the accessory drive belt 15, and the compressor 31 may be configured to compress the refrigerant using the power of the internal combustion engine 11. The compressor 31 may be detachably connected to a pulley of the accessory drive belt 15 through a clutch 16. An alternator 18 may be operatively connected to the accessory drive belt 15. The power of the internal combustion engine 11 may be transmitted to the alternator 18 through the accessory drive belt 15 so that the alternator 18 may generate electrical energy. The alternator 18 may be configured to supply the electrical energy to a cooling fan 19, the air blower 22, a headlight, and other electrical components.

The condenser 32 may be adjacent to a front grille 2 of the vehicle. The radiator 13 may be located behind the condenser 32, and the cooling fan 19 may be located behind the condenser 32 and the radiator 13.

The heater core 24 may be located on the downstream side of the evaporator 23, and the heater core 24 may be configured to heat the air. According to an exemplary embodiment, the heater core 24 may be configured to heat the air using an engine coolant heated by the engine. According to another exemplary embodiment, the heater core 24 may be an electric heater.

The air mixing door 25 may be rotatably disposed between the evaporator 23 and the heater core 24.

The control system 50 may control the operations of the pump 14 of the engine cooling system 10, the alternator 18, the cooling fan 19, the clutch 16 of the compressor 31, the air blower 22, and the like, thereby controlling the engine cooling system 10 and the HVAC system 20.

Figure 2:
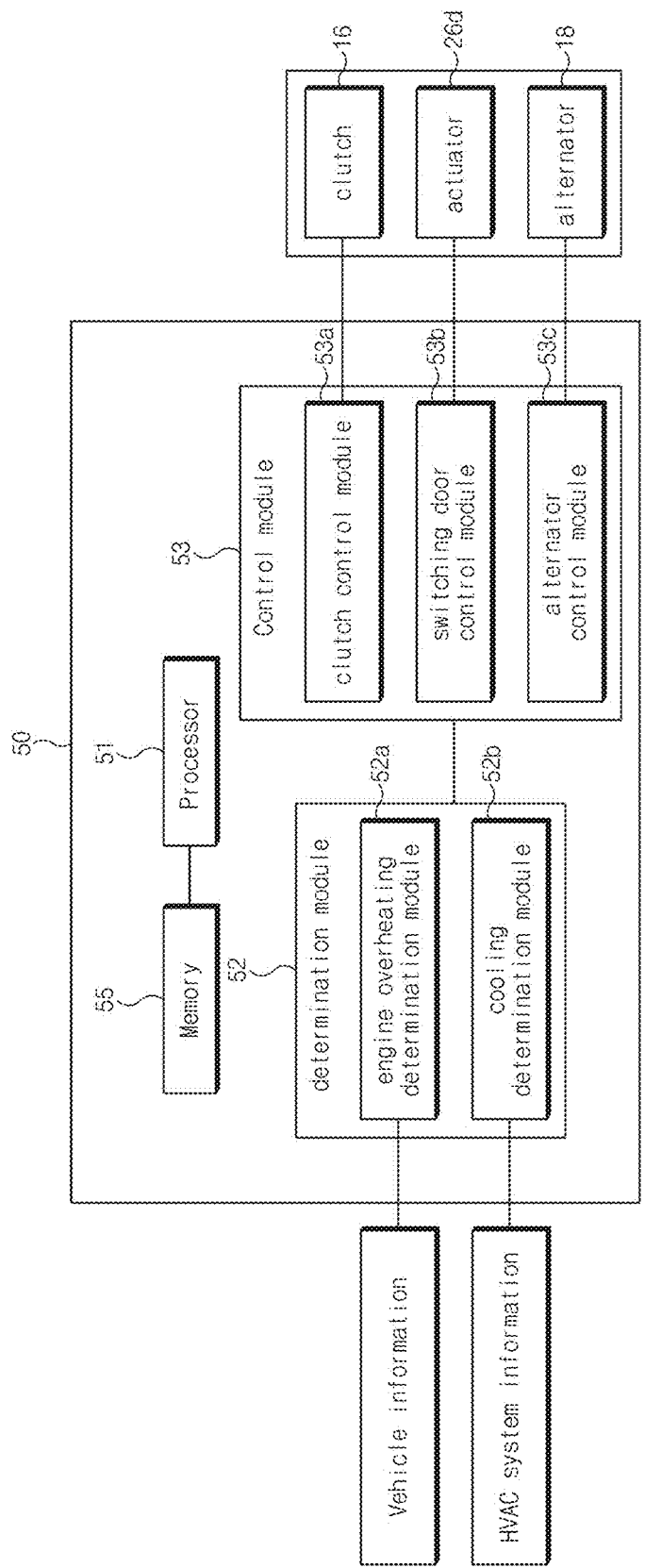
FIG. 2 illustrates a block diagram of a control system for a vehicle according to an exemplary embodiment of the present disclosure.

Referring to FIG. 2, the control system 50 may include a processor 51 and a memory 55. The processor 51 may receive instructions and data stored in the memory 55 and transmit instructions to actuators. The actuators may be the pump 14 of the engine cooling system 10, the alternator 18, the cooling fan 19, the clutch 16 of the compressor 31, the air blower 22, and the like. The memory 55 may be a data store such as a hard disk drive, a solid state drive, a server, a volatile storage medium, and a non-volatile storage medium. The memory 55 may include a read-only memory (ROM), a random access memory (RAM), an electrically programmable read only memory (EPROM), and a high speed clock. The control system 50 may be an independent type control system, or may be embedded in a vehicle controller such as an engine control unit (ECU) or an engine control module.

In addition, the control system 50 may include a determination module 52 determining whether a reduction in cooling capacity is required, and a control module 53 operatively connected to the determination module 52.

The determination module 52 may include an engine overheating determination module 52a determining whether the internal combustion engine 11 is overheated, and a cooling determination module 52b determining whether a cooling condition of the passenger compartment meets a reference cooling condition. The determination module 52 may be a hardware module or a software module.

The engine overheating determination module 52a may receive driving information of the vehicle, such as a vehicle speed, information of an accelerator position sensor (APS), and a temperature of the engine coolant, from the vehicle controller such as ECU, and determine whether the internal combustion engine 11 is overheated based on the received driving information of the vehicle. For example, by determining whether an engine coolant temperature is higher than a threshold temperature, the engine overheating determination module 52a may determine whether the internal combustion engine 11 is overheated.

The cooling determination module 52b may receive cooling information of the passenger compartment, such as a temperature of the evaporator 23 and a solar radiation quantity, and determine whether the cooling condition of the passenger compartment meets the reference cooling condition based on the received cooling information. Specifically, the cooling determination module 52b may determine whether an accumulated cooling capacity (or accumulated cooling power) provided by the HVAC system 20 meets a reference accumulated cooling capacity.

When it is determined by the engine overheating determination module 52a that the internal combustion engine 11 is overheated, or when it is determined by the cooling determination module 52b that a required cooling condition for the passenger compartment is satisfied, the determination module 52 may determine whether a reduction in the cooling capacity provided by the HVAC system 20 is required.

The control module 53 may include a clutch control module 53a controlling the clutch 16 of the compressor 31, a switching door control module 53b controlling the actuator 26d of the switching door 26c, and an alternator control module 53c controlling the alternator 18. The control module 53 may be a hardware module or a software module.

The clutch control module 53a may operate or stop the clutch 16 so that the compressor 31 may be operated or stopped.

The switching door control module 53b may operate or stop the actuator 26d of the switching door 26c so that the switching door 26c may move between the indoor-air circulation position and the outdoor-air intake position.

The alternator control module 53c may control the alternator 18 to adjust power output from the alternator 18.

Figure 3:
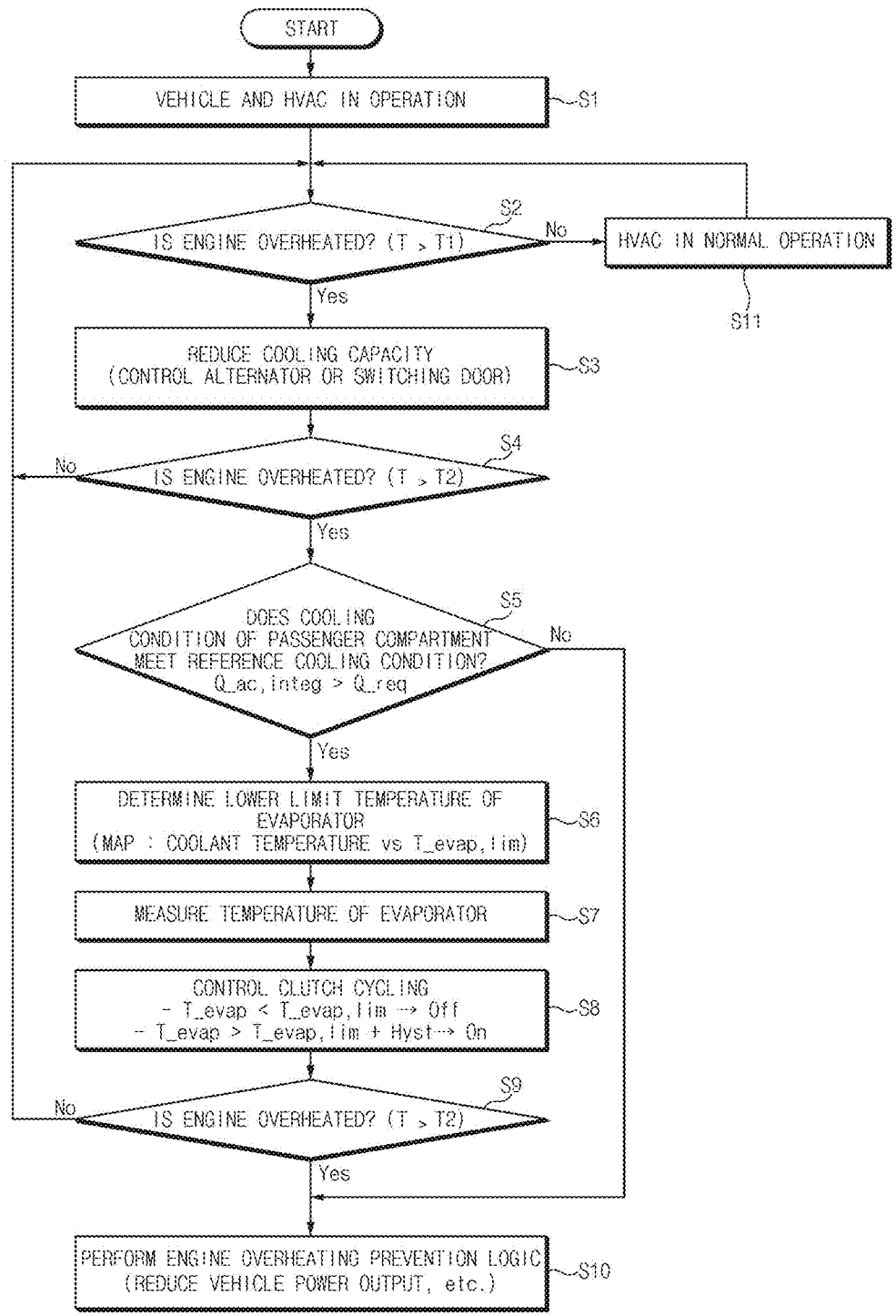
FIG. 3 illustrates a flowchart of a control method for a vehicle according to an exemplary embodiment of the present disclosure.

FIG. 3 illustrates a flowchart of a control method for a vehicle according to an exemplary embodiment of the present disclosure.

While the vehicle is driving and the HVAC system 20 is operating in a cooling mode at S1, the engine overheating determination module 52a may primarily determine whether the internal combustion engine 11 is overheated by determining whether the overheating degree of the internal combustion engine 11 exceeds a first overheating degree at S2. According to an exemplary embodiment, it may be determined whether a temperature T of an engine coolant discharged from the water jacket of the internal combustion engine 11 is higher than a first threshold temperature T1, and it may be primarily determined that the internal combustion engine 11 is overheated when the temperature T of the engine coolant is higher than the first threshold temperature T1. The first threshold temperature T1 may be a reference temperature of the engine coolant for determining whether the internal combustion engine 11 is overheated.

When it is determined in S2 that the overheating degree of the internal combustion engine 11 exceeds the first overheating degree (that is, the temperature T of the engine coolant is higher than the first threshold temperature T1), the control module 53 may control the alternator 18 or the actuator 26d of the switching door 26c to reduce the cooling capacity or cooling power provided by the HVAC system 20 at S3.

According to an embodiment, the alternator control module 53c may control the alternator 18 so that power output from the alternator 18 may be lower than maximum output power of the alternator 18. When the alternator 18 outputs the maximum output power, power applied to the air blower 22 of the HVAC system 20 and the cooling fan 19 may be a maximum value, and thus power consumption may be high and fuel efficiency may be lowered. Since the power output from the alternator 18 is lower than the maximum output power of the alternator 18, the power applied to the air blower 22 may be relatively lowered so that a flow rate of the air passing through the HVAC casing 21 of the HVAC system 20 may be relatively reduced. Accordingly, the cooling capacity or cooling power provided by the HVAC system 20 may be relatively reduced.

According to an embodiment, the switching door control module 53b may control the actuator 26d of the switching door 26c to adjust the position of the switching door 26c. The switching door control module 53b may adjust the position of the switching door 26c to vary an indoor air fraction according to the temperature T of the engine coolant discharged from the water jacket of the internal combustion engine 11. For example, the switching door control module 53b may control the actuator 26d of the switching door 26c to adjust the position of the switching door 26c so that the indoor air fraction may increase as the temperature T of the engine coolant increases. As the indoor air fraction increases, the cooling capacity or cooling power provided by the HVAC system 20 may be relatively reduced. Accordingly, as a load of the compressor 31 decreases, a load of the internal combustion engine 11 may decrease and the cooling of the air provided by the condenser 32 may be improved. Thus, the temperature of the engine coolant cooled by the radiator 13 may be further lowered.

When it is determined in S2 that the overheating degree of the internal combustion engine 11 is lower than or equal to the first overheating degree, the HVAC system 20 may operate normally in the cooling mode at S11.

After the cooling capacity is reduced by the control module 53, the engine overheating determination module 52a may secondarily determine whether the internal combustion engine 11 is overheated by determining whether the overheating degree of the internal combustion engine 11 exceeds a second overheating degree at S4. The second overheating degree may be higher than the first overheating degree. According to an exemplary embodiment, it may be determined whether the temperature T of the engine coolant discharged from the water jacket of the internal combustion engine 11 is higher than a second threshold temperature T2, and it may be secondarily determined that the internal combustion engine 11 is overheated when the temperature T of the engine coolant is higher than the second threshold temperature T2. The second threshold temperature T2 may be a reference temperature of the engine coolant for determining whether the internal combustion engine 11 is overheated, and the second threshold temperature T2 may be higher than the first threshold temperature T1.

When it is determined in S4 that the overheating degree of the internal combustion engine 11 is lower than or equal to the second overheating degree, the method may return to S2.

When it is determined in S4 that the overheating degree of the internal combustion engine 11 exceeds the second overheating degree, the cooling determination module 52b may determine whether a cooling condition of the passenger compartment meets a reference cooling condition at S5. Specifically, it may be determined whether the cooling condition of the passenger compartment meets the reference cooling condition by determining whether an accumulated cooling capacity ($Q\_ac,integ$) provided by the HVAC system 20 exceeds a reference accumulated cooling capacity ($Q\_req$).

The accumulated cooling capacity ($Q\_ac,integ$) may be the sum of cooling capacities accumulated after the operation of the HVAC system 20. The accumulated cooling capacity ($Q\_ac,integ$) may be expressed as the following Equation 1:

$$Q\_ac, integ = \frac{(\text{Outdoor Air Temperature} - \text{Evaporator Temperature}) \times}{t\_cool \times CP \times \text{Air Volume}} \qquad \text{Equation 1}$$

Here, (Outdoor Air Temperature-Evaporator Temperature) may be a temperature difference between the outdoor air temperature and the evaporator temperature, t_cool may be an operating time of the HVAC system 20, Cp may be specific heat, and Air Volume may be the amount of air blown by the air blower 22.

The reference accumulated cooling capacity ($Q\_req$) may be determined according to the outdoor air temperature and the solar radiation quantity as shown in table 1 below.

TABLE 1

| | | Outdoor Air Temperature (° C.) | | |
|---|---|---|---|---|
| Q_req (kJ) | | 25 | 30 | 35 |
| Solar Radiation (W/m$^2$) | 0 | 283 | 663 | 1,055 |
| | 300 | 817 | 1,194 | 1,582 |
| | 600 | 1,324 | 1,697 | 2,081 |
| | 900 | 1,808 | 2,177 | 2,557 |
| | 1200 | 2,273 | 2,617 | 2,999 |

When it is determined in S5 that the cooling condition of the passenger compartment meets the reference cooling condition (that is, the accumulated cooling capacity ($Q\_ac, integ$) provided by the HVAC system 20 exceeds the reference accumulated cooling capacity (Q_req)), a lower limit temperature (T_evap,lim) of the evaporator 23 may be determined according to the temperature of the engine coolant at S6. The lower limit temperature (T_evap,lim) of the evaporator 23 may be determined to meet the cooling condition of the passenger compartment, prevent freezing of the evaporator 23, and improve fuel efficiency. Specifically, as the temperature of the engine coolant increases, the lower limit temperature of the evaporator 23 may increase as shown in table 2 below.

TABLE 2

| | Temperature of Engine Coolant | | | |
| --- | --- | --- | --- | --- |
| 108° C. or Lower | 110° C. | 111° C. | 112° C. | Exceeding 112° C. |
| Lower Limit Temperature of Evaporator | | | | |
| 0.5 | 4 | 6 | 8 | 10 |

After the lower limit temperature of the evaporator 23 is determined, a temperature (T_evap) of the evaporator 23 may be measured at S7. By comparing the temperature (T_evap) of the evaporator 23 and the lower limit temperature (T_evap,lim) of the evaporator 23, the clutch 16 of the compressor 31 may be repeatedly turned on/off (on-off cycling) at S8. Specifically, when the temperature (T_evap) of the evaporator 23 is lower than the lower limit temperature (T_evap,lim) of the evaporator 23, the clutch 16 may be turned off by the clutch control module 53a, and when the temperature (T_evap) of the evaporator 23 is higher than a restart temperature (T_evap,lim+Hyst), the clutch 16 may be turned on by the clutch control module 53a. The restart temperature may be a reference temperature for determining whether the temperature of the evaporator 23 has increased to the extent that the cooling condition of the passenger compartment is not satisfied after the clutch 16 of the compressor 31 is turned off. When the temperature of the evaporator 23 is higher than the restart temperature, the operation of the compressor 31 may be required. Specifically, the restart temperature (T_evap,lim+Hyst) may be the sum of the lower limit temperature (T_evap,lim) of the evaporator 23 and a restart hysteresis temperature (Hyst). For example, the restart hysteresis temperature (Hyst) may be 2° C. As the clutch 16 of the compressor 31 is repeatedly turned on/off, the load of the internal combustion engine 11 may be relatively reduced, and thus the overheating degree (that is, the temperature) of the internal combustion engine 11 may be relatively lowered.

After the on-off cycling of the clutch 16, the engine overheating determination module 52a may tertiarily determine whether the internal combustion engine 11 is overheated by determining whether the overheating degree of the internal combustion engine 11 exceeds the second overheating degree at S9. According to an exemplary embodiment, it may be determined whether the temperature T of the engine coolant discharged from the water jacket of the internal combustion engine 11 is higher than the second threshold temperature T2, and it may be determined that the internal combustion engine 11 is overheated when the temperature T of the engine coolant is higher than the second threshold temperature T2.

When it is determined in S9 that the overheating degree of the internal combustion engine 11 is lower than or equal to the second overheating degree, the method may return to S2.

When it is determined in S9 that the overheating degree of the internal combustion engine 11 exceeds the second overheating degree, the control system 50 may perform an engine overheating prevention logic at S10. For example, the engine overheating prevention logic may be designed to prevent the overheating of the internal combustion engine 11 by reducing the output of the internal combustion engine 11.

When it is determined in S5 that the cooling condition of the passenger compartment does not meet the reference cooling condition (that is, the accumulated cooling capacity (Q_ac,integ) provided by the HVAC system 20 is lower than or equal to the reference accumulated cooling capacity (Q_req)), the control system 50 may perform the engine overheating prevention logic at S10.

As set forth above, according to exemplary embodiments of the present disclosure, by determining whether the internal combustion engine is overheated based on the driving information of the vehicle and the cooling information of the passenger compartment, and reducing the cooling capacity of the HVAC system when the internal combustion engine is overheated, the cooling of the engine coolant and the cooling of the passenger compartment may be improved.

According to exemplary embodiments of the present disclosure, by reducing the cooling capacity provided by the HVAC system when the internal combustion engine is overheated, a fixed displacement compressor or an internal variable displacement compressor, which is relatively inexpensive, may be used without the need of a relatively expensive external variable displacement compressor, and thus the manufacturing cost of the vehicle may be significantly reduced. In addition, since the external variable displacement compressor is not used, the thickness of the radiator may be reduced, and thus the cooling of the passenger compartment may be improved and the manufacturing cost of the vehicle may be further reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A control method for a vehicle, the control method comprising:
controlling, by the processor, an alternator or an actuator of a switching door to reduce a cooling capacity provided by the HVAC system by determining whether a temperature of an engine coolant discharged from the internal combustion engine is higher than a first threshold temperature;
determining whether an accumulated cooling capacity provided by the HVAC system exceeds a reference accumulated cooling capacity by determining whether the temperature of an engine coolant discharged from the internal combustion engine is higher than a second threshold temperature after the cooling capacity is reduced;
determining a lower limit temperature of an evaporator of the HVAC system according to a temperature of an engine coolant when the accumulated cooling capacity exceeds the reference accumulated cooling capacity; and
repeatedly turning a clutch of a compressor of the HVAC system on or off by comparing a temperature of the evaporator and a lower limit temperature of the evaporator;

wherein the second threshold temperature is higher than the first threshold temperature; and wherein the accumulated cooling capacity is the sum of cooling capacities accumulated after the operation of the HVAC system.

2. The control method according to claim 1, wherein the alternator is controlled so that power output from the alternator is lower than maximum output power of the alternator.

3. The control method according to claim 1, wherein the actuator of the switching door is controlled so that an indoor air fraction increases as a temperature of an engine coolant increases.

4. The control method according to claim 1, wherein the clutch is turned off when the temperature of the evaporator is lower than the lower limit temperature of the evaporator,
the clutch is turned on when the temperature of the evaporator is higher than a restart temperature, and
the restart temperature is the sum of the lower limit temperature of the evaporator and a restart hysteresis temperature.

5. A control system for a vehicle, the control system comprising:
a processor configured to control an engine cooling system and a heating, ventilation, and air conditioning (HVAC) system;
a determination module configured to determine whether a reduction in cooling capacity is required; and
a control module configured to control a clutch of a compressor of the HVAC system, an actuator of a switching door of the HVAC system, and an alternator through the determination module,
wherein the determination module includes:
an engine overheating determination module configured to determine whether an internal combustion engine is overheated by determining whether a temperature of an engine coolant discharged from the internal combustion engine is higher than a first threshold temperature; and
a cooling determination module configured to determine whether a cooling condition of a passenger compartment meets a reference cooling condition;

wherein the cooling determination module determines whether the cooling condition of the passenger compartment meets the reference cooling condition based on cooling information of the passenger compartment, wherein the control module includes a clutch control module controlling the clutch of the compressor connected to HVAC system, wherein the cooling determination module determines whether an accumulated cooling capacity provided by the HVAC system exceeds a reference accumulated cooling capacity by determining whether the temperature of an engine coolant discharged from the internal combustion engine is higher than a second threshold temperature after the cooling capacity is reduced, wherein the processor determines a lower limit temperature of an evaporator of the HVAC system according to a temperature of an engine coolant when the accumulated cooling capacity exceeds the reference accumulated cooling capacity, wherein the clutch control module controls to repeatedly turn a clutch of a compressor of the HVAC system on or off by comparing a temperature of the evaporator and the lower limit temperature of the evaporator, wherein the second threshold temperature is higher than the first threshold temperature, and wherein the accumulated cooling capacity is the sum of cooling capacities accumulated after the operation of the HVAC system.

6. The control system according to claim 5, wherein the engine overheating determination module determines whether the internal combustion engine is overheated based on driving information of the vehicle.

7. The control system according to claim 5, wherein the control module further includes:
a clutch control module configured to control the clutch of the compressor connected to the HVAC system;
a switching door control module configured to control the actuator of the switching door adjusting an indoor air fraction; and
an alternator control module configured to control the alternator.

* * * * *